United States Patent
Huth et al.

(10) Patent No.: US 10,843,277 B2
(45) Date of Patent: Nov. 24, 2020

(54) PORTABLE JIG AND FIXTURE FOR PRECISION MACHINING

(71) Applicant: General Electric Company, Schenectady, NY (US)

(72) Inventors: Robert Edward Huth, Greenville, SC (US); Jason Matthew Clark, Maryville, TN (US)

(73) Assignee: General Electric Company, Schenectady, NY (US)

( * ) Notice: Subject to any disclaimer, the term of this patent is extended or adjusted under 35 U.S.C. 154(b) by 265 days.

(21) Appl. No.: 15/406,947

(22) Filed: Jan. 16, 2017

(65) Prior Publication Data
US 2018/0200806 A1    Jul. 19, 2018

(51) Int. Cl.
*B23Q 9/00* (2006.01)
*B23B 47/28* (2006.01)
(Continued)

(52) U.S. Cl.
CPC ............ *B23B 47/28* (2013.01); *B23Q 9/0042* (2013.01); *F01D 5/025* (2013.01); *F01D 5/026* (2013.01); *F01D 21/04* (2013.01); *F01D 21/045* (2013.01); *F01D 21/06* (2013.01); *F01D 21/10* (2013.01); *F01D 21/14* (2013.01); *F01D 25/285* (2013.01); *F02C 3/04* (2013.01); *F02C 3/14* (2013.01); *F02C 7/22* (2013.01); *F04D 29/522* (2013.01); *F04D 29/644* (2013.01);
(Continued)

(58) Field of Classification Search
CPC ............ B23B 2215/76; B23B 2247/04; B23B 2247/12; B23B 49/00; B23B 47/00; B23P 2700/13; B23Q 9/0042; F05D 2230/80; F23R 2900/00016; F23R 2900/19
USPC .......................................................... 408/130
See application file for complete search history.

(56) References Cited

U.S. PATENT DOCUMENTS 4,594,030 A * 6/1986 Weigel, Jr. ............... B23Q 5/06
                                                         173/19
5,161,291 A    11/1992 Guenther
(Continued)

FOREIGN PATENT DOCUMENTS

EP    2256318 A1    12/2010
EP    2565379 A2    3/2013
(Continued)

OTHER PUBLICATIONS

European Search Report for EP Application No. 18151782.2; dated Jun. 27, 2018; 8 pages.

*Primary Examiner* — Craig Kim
*Assistant Examiner* — Alyson Joan Harrington
(74) *Attorney, Agent, or Firm* — Dority & Manning, P.A.

(57) ABSTRACT

A portable jig and fixture having at least one base plate, a column assembly removably coupled to the at least one base plate, a slide assembly removably coupled to the column assembly, a power feed head removably coupled to the slide assembly, and a spindle unit removably coupled with the slide assembly having a motor removably engaged it. At least one cutter assembly is removably engaged with the spindle unit and at least one drill jig is also removably engaged with the spindle unit. Also, a turbomachine having complementary structure on the compressor discharge casing can engage with the at least one base plate alignment mounting structure on the portable jig and fixture.

16 Claims, 11 Drawing Sheets

(51) Int. Cl.
  *F02C 3/04*   (2006.01)
  *F02C 3/14*   (2006.01)
  *F02C 7/22*   (2006.01)
  *F04D 29/52*  (2006.01)
  *F04D 29/64*  (2006.01)
  *F01D 25/28*  (2006.01)
  *F01D 21/06*  (2006.01)
  *F01D 21/14*  (2006.01)
  *F01D 5/02*   (2006.01)
  *F01D 21/04*  (2006.01)
  *F01D 21/10*  (2006.01)
  *F02C 6/12*   (2006.01)

(52) U.S. Cl.
  CPC ....... *B23B 2215/76* (2013.01); *B23P 2700/13* (2013.01); *F02C 6/12* (2013.01); *F05D 2220/32* (2013.01); *F05D 2220/40* (2013.01); *F05D 2230/10* (2013.01); *F05D 2230/14* (2013.01); *F05D 2230/237* (2013.01); *F05D 2230/238* (2013.01); *F05D 2240/35* (2013.01); *F05D 2260/311* (2013.01); *F23R 2900/00018* (2013.01); *F23R 2900/00019* (2013.01)

(56) References Cited

U.S. PATENT DOCUMENTS

| | | |
|---|---|---|
| 5,284,406 A | 2/1994 | Mueller et al. |
| 5,699,947 A | 12/1997 | Cavallo et al. |
| 6,607,114 B2 | 8/2003 | Reser et al. |
| 8,133,017 B2 * | 3/2012 | Schott ............ F01D 9/04 415/207 |
| 8,276,488 B2 | 10/2012 | Backhouse |
| 8,425,162 B2 * | 4/2013 | Schevers ............ B23Q 5/225 408/100 |
| 9,617,913 B2 * | 4/2017 | Oden ............ F02C 3/00 |
| 2004/0101376 A1 * | 5/2004 | Shemeta ............ B23Q 5/26 408/130 |
| 2005/0132570 A1 | 6/2005 | Bouchard et al. |
| 2005/0198821 A1 | 9/2005 | Reville et al. |
| 2009/0077795 A1 | 3/2009 | Prince et al. |
| 2012/0272660 A1 * | 11/2012 | Garrett ............ F23R 3/002 60/796 |
| 2012/0294689 A1 * | 11/2012 | Yagista ............ B23B 51/0036 409/200 |
| 2012/0304648 A1 * | 12/2012 | Byrne ............ F23R 3/06 60/737 |
| 2013/0031906 A1 * | 2/2013 | DiCintio ............ F23R 3/045 60/737 |
| 2014/0069523 A1 | 3/2014 | Sutra Cole et al. |
| 2014/0260319 A1 * | 9/2014 | Melton ............ F23R 3/60 60/796 |
| 2015/0260096 A1 * | 9/2015 | Oden ............ F02C 3/00 431/154 |
| 2016/0097282 A1 | 4/2016 | Clark et al. |
| 2017/0030224 A1 * | 2/2017 | Alvarez ............ F01D 25/285 |

FOREIGN PATENT DOCUMENTS

| | | |
|---|---|---|
| EP | 2565379 A3 | 12/2017 |
| GB | 2103126 A | 2/1983 |
| JP | 60-085808 | 5/1985 |

* cited by examiner

PORTABLE JIG AND FIXTURE FOR PRECISION MACHINING

FIELD OF THE DISCLOSURE

The disclosure relates generally to turbomachines, and more specifically to portable jigs and fixtures configured for precision machining of turbomachinery, including gas turbines.

BACKGROUND OF THE DISCLOSURE

Tooling for machining turbomachines requires high precision jigs and fixtures due to non-standard sizing of work pieces, low machining tolerances, advanced materials of construction, and small access clearances for tools. In the production and retrofit of casings for turbomachines such as gas turbines, it is necessary to machine openings such as apertures, slots and other shaped openings in various locations along the drive train. The machining process is tedious, time consuming, and sometimes impossible for standard tooling. Without high precision tooling and fixturing, the turbomachine casing cannot be constructed or modified to install the equipment needed for axial fuel injection systems and other combustion equipment. The locating features on standard tooling does not provide precise fit-up capability to specific complementary mounting structures on the turbomachine, nor does it provide rigidity and location accuracy required to complete the machining operation within specifications.

Axial fuel injection system (AFS) assemblies, also referred to as late lean injection assemblies, are expensive and costly for both new gas turbine units and retrofits of existing units. One of the reasons for this is the complexity of late lean injection systems, particularly those systems associated with the fuel delivery. The many parts associated with these complex systems must be precisely machined and installed to withstand the extreme thermal and mechanical loads of the turbine environment, which significantly increases manufacturing and machining expense. Without precise installation, conventional axial fuel injection assemblies have a high risk for fuel leakage into the compressor discharge casing, which can result in auto-ignition and other safety concerns.

BRIEF DESCRIPTION OF THE DISCLOSURE

Aspects and advantages of the disclosure will be set forth in part in the following description, or may be obvious from the description, or may be learned through practice of the disclosure.

One embodiment is a portable jig and fixture having at least one base plate comprising a proximate side and a distal side, and a column assembly having a proximate portion and a distal portion, wherein the column assembly proximate portion is removably coupled to the distal side of the at least one base plate. A slide assembly, having a proximate end and a distal end, is removably coupled to the column assembly. A power feed head is removably coupled to the distal end of the slide assembly. A spindle unit, having an input portion and an output portion, is removably coupled with the slide assembly and has a motor removably engaged with the input portion of the spindle unit. At least one cutter assembly is removably engaged with the output portion of the spindle unit, and at least one drill jig is also removably engaged with the output portion of the spindle unit.

Another embodiment is a turbomachine having a compressor section extending downstream to a compressor discharge casing; and a plurality of combustors having at least one axial fuel injection system, the plurality of combustors being configured in a combustion section at least partially surrounded by the compressor discharge casing. A turbine section is positioned downstream from the combustion section. The compressor discharge casing is removably engaged with a portable jig and fixture described above. Also, each of the at least one base plates on the jig and fixture has alignment mounting structure engaging with complementary structure on the compressor discharge casing.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure, including the best mode thereof, directed to one of ordinary skill in the art, is set forth in the specification, which makes reference to the appended figures, in which.

Figure 1:
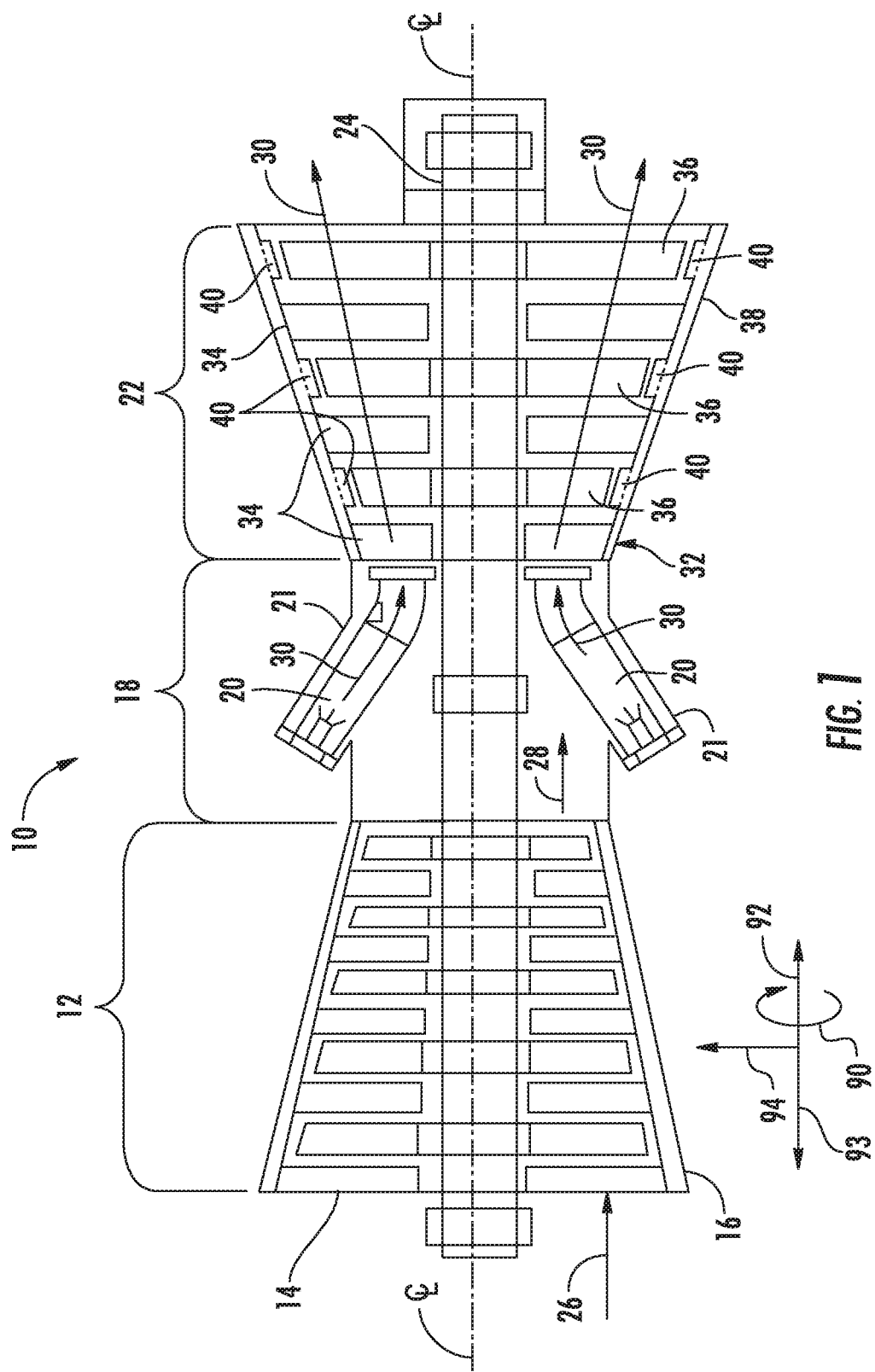
FIG. 1 is a schematic of an exemplary turbomachine such as a gas turbine.

Repeat use of reference characters in the present specification and drawings is intended to represent the same or analogous features or elements of the present disclosure.

DETAILED DESCRIPTION OF THE DISCLOSURE

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel to an axial centerline of a particular component. The terms "distal" and "proximal" are used in the following description with respect to a position or direction relative to the turbomachine casing. "Distal" or "distally" are a position distant from or in a direction away from the casing. "Proximal" and "proximally" are a position near or in a direction toward the casing.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of an industrial gas turbine for purposes of illustration, one of ordinary skill in the art will readily appreciate that embodiments of the present invention may be applied to any turbomachine including but not limited to an aero-derivative turbine, marine gas turbine as well as an aero engine turbine, unless specifically recited in the claims.

The portable jig and fixture disclosed herein is capable of field machining apertures and other shapes of non-standard sizing accurately and reliably without modifications to the existing turbomachine. Matching existing bolt hole patterns and other complementary casing structure on the turbomachine allows the jig and fixture to precisely mount and perform the work. Using defined datum and the known position of the bolt holes and cover plates provides accurate working tool configurations. The structure of the jig and fixture is optimized for both strength and stiffness. The jig and fixture provides a working tool (drilling, boring, milling, etc.) to be fitted to it, and with tooling positions verified, the machining can be precisely performed to specifications. The jig and fixture also provides minimal down time for performing modifications to the turbomachine.

Referring now to the drawings, wherein like numerals refer to like components, FIG. 1 illustrates an example of a turbomachine 10, such as a gas turbine, as may incorporate various embodiments of the present invention. Directional orientation, consistent in all figures, is defined as circumferential direction 90, downstream axial direction 92, upstream axial direction 93, and radial direction 94. As shown, the turbomachine 10 generally includes a compressor section 12 having an inlet 14 disposed at an upstream end of the turbomachine 10, and a casing 16 that at least partially surrounds the compressor section 12. The turbomachine 10 further includes a combustion section 18 having at least one combustor 20 downstream from the compressor section 12, a compressor discharge casing 21 at least partially surrounding the combustion section 18, and a turbine section 22 positioned downstream from the combustion section 18. As shown, the combustion section 18 may include a plurality of the combustors 20. A shaft 24 extends axially through the turbomachine 10.

In operation, air 26 is drawn into the inlet 14 of the compressor section 12 and is progressively compressed to provide a compressed air 28 to the combustion section 18. The compressed air 28 flows into the combustion section 18 and is mixed with fuel in the combustor 20 to form a combustible mixture. The combustible mixture is burned in the combustor 20, thereby generating a hot gas 30 that flows from the combustor 20 across a first stage 32 of turbine nozzles 34 and into the turbine section 22. The turbine section generally includes one or more rows of rotor blades 36 axially separated by an adjacent row of the turbine nozzles 34. The rotor blades 36 are coupled to the rotor shaft 24 via a rotor disk. A turbine casing 38 at least partially encases the rotor blades 36 and the turbine nozzles 34. Each or some of the rows of rotor blades 36 may be circumferentially surrounded by a shroud block assembly 40 that is disposed within the turbine casing 38. The hot gas 30 rapidly expands as it flows through the turbine section 22. Thermal and/or kinetic energy is transferred from the hot gas 30 to each stage of the rotor blades 36, thereby causing the shaft 24 to rotate and produce mechanical work. The shaft 24 may be coupled to a load such as a generator (not shown) so as to produce electricity. In addition or in the alternative, the shaft 24 may be used to drive the compressor section 12 of the turbomachine.

Figure 2:
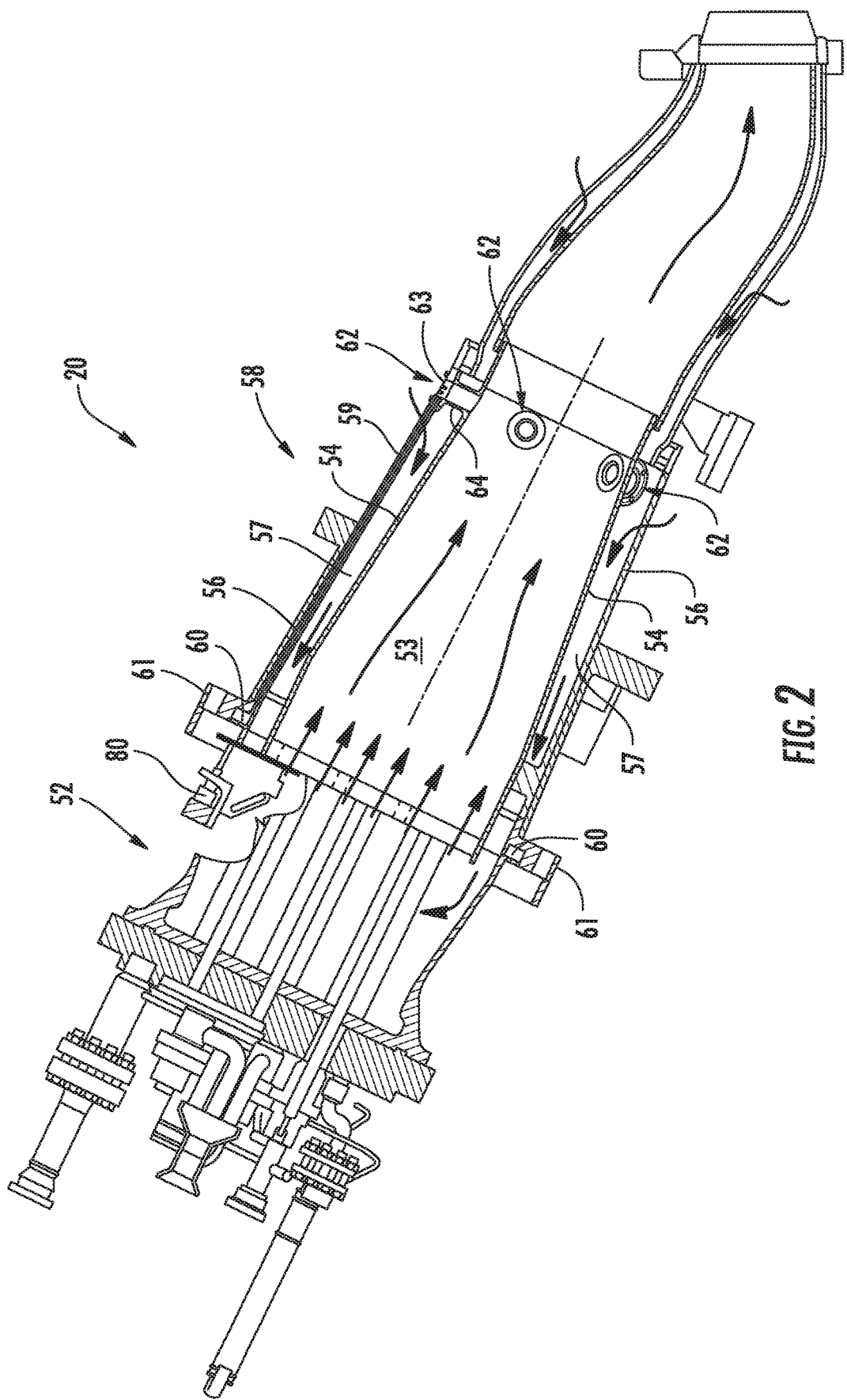
FIG. 2 is a side view of a jig and fixture embodiment positioned for machining a penetration for a combustor having an axial fuel injection system according to aspects of exemplary embodiments.

FIG. 2 is a side view of an exemplary jig and fixture 80 positioned for machining penetrations in a combustor 20 having an axial fuel injection system (AFS) 58 according to aspects of exemplary embodiments. AFS enables fuel combustion to occur downstream of the primary combustors/primary combustion zone to improve NOx emissions performance. The AFS also enables turndown to 35% of baseload with inlet bleed heating across the conventional premix load range and can also can increase part load simple cycle efficiency by reducing the fuel burn rate by 2%. AFS can also deliver additional output by increasing firing temperatures.

Figure 3:
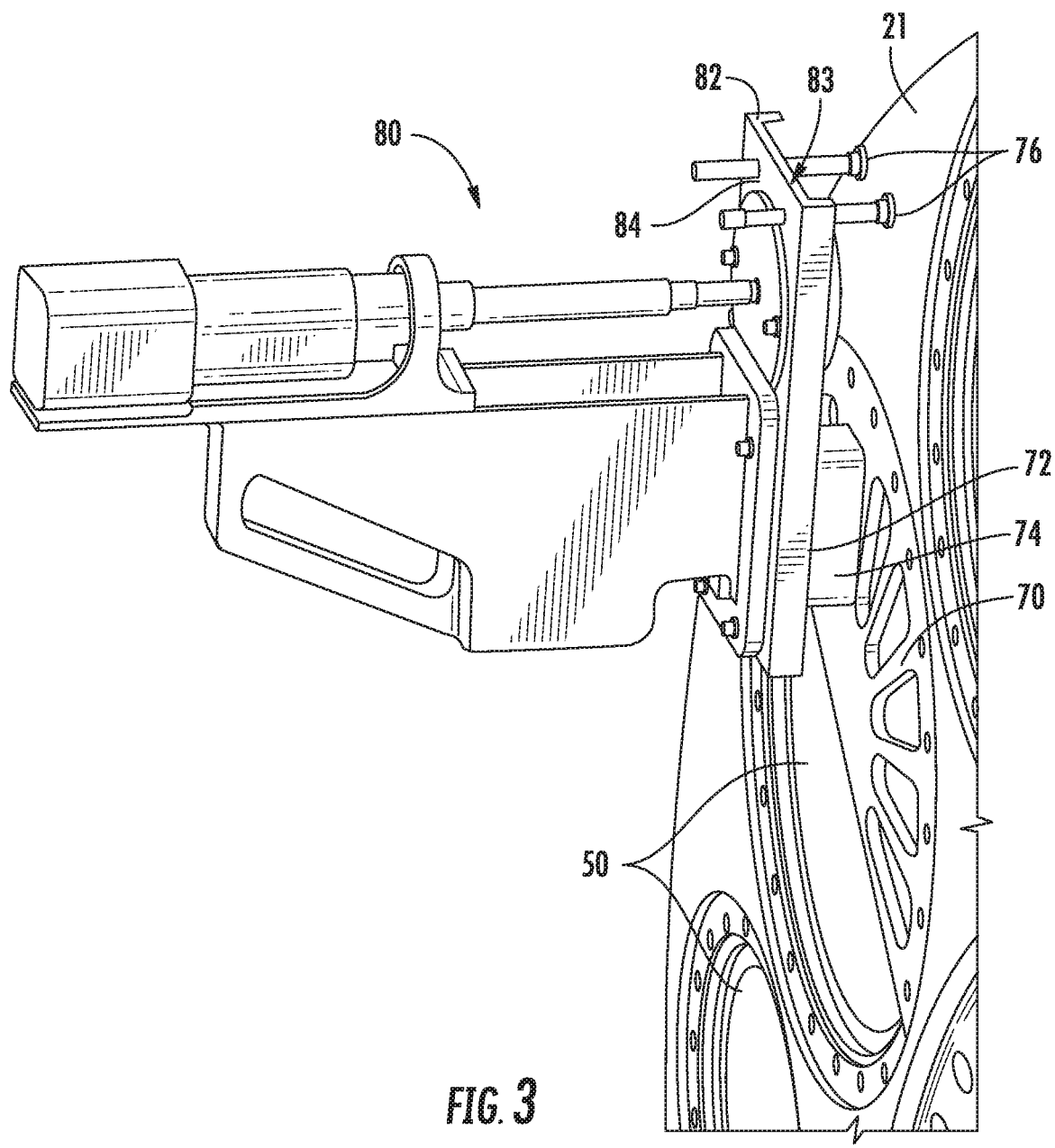
FIG. 3 shows a jig and fixture embodiment positioned for machining an aperture in a compressor discharge casing using mounting structure disclosed herein.

With reference to both FIG. 2 and FIG. 3, the axial fuel injection system 58 may include a fuel passageway 59 defined within the flow sleeve 56 inserted through combustor openings 50 in the compressor discharge casing (CDC) 21. The fuel passageway 59 can originate at a fuel manifold 60 adjacent the fuel head assembly 52 and can be defined within a flow sleeve flange 61 positioned at the forward end of the flow sleeve 56. The fuel passageway 59 may extend from the fuel manifold 60 to an axial fuel injector 62. As shown the axial fuel injectors 62 may be positioned at or near the aft end of the flow sleeve 56. According to certain embodiments, the axial fuel injectors 62 may include a nozzle or axial fuel nozzle 63 and a transfer tube 64. The axial fuel nozzle 33 and the transfer tube 34 may carry compressed air from the CDC 21 to the combustion zone 53 inside of the liner 54. Along the way, the compressed air may mix with fuel that is delivered through the axial fuel nozzle 63. Small openings or fuel outlets formed around the inner wall of the axial fuel nozzle 63 may inject the fuel that is delivered via the fuel passageway 59. The transfer tube 64 carries the fuel/air mixture across the flow annulus 57 and injects the mixture into the flow of hot gas within the liner 54. The fuel/air mixture then may combust within the flow of hot gas, thereby adding more energy to the flow and improving NOx emissions.

The fuel passageways 59 require compressor discharge casing 21 penetrations that can be drilled or machined using the jig & fixture 80 disclosed herein. Those of ordinary skill in the art will appreciate that other configurations for the inlet of the fuel passageway 59 are also possible that will require other CDC 21 penetration locations to be drilled by the jig & fixture 80. Accordingly, in operation, fuel flows through the machined CDC 21 openings into the fuel manifold 60, through the fuel passageways 59 formed through the flow sleeve 56, and then to the axial fuel injectors 62. The axial fuel nozzle 63 may be configured to accept the flow of fuel and distribute it through the fuel outlets 63 that are arrayed about the inner wall of the axial fuel nozzle 63 so that the fuel mixes with the flow of CDC 21 air entering the axial fuel nozzle 63 from the exterior of the flow sleeve 56.

FIG. 3 shows the jig and fixture 80 positioned for machining an aperture in the CDC 21 using a complementary cover plate 70 temporarily installed on a combustor opening 50. Alignment mounting structure 72 can include a plurality of projections 74 extending from the proximate side 83 of the base plate 82 and removably engaged in predetermined positions with the complementary cover plate 70 temporarily mounted on the compressor discharge casing 21, for example, in a combustor opening 50. Alignment mounting structure 72 can also include stand-off bolts 76 as well as base plate hole patterns aligned with match-drilled holes in the CDC 21 for flush bolting the jig & fixture 80 to the CDC 21.

Figure 4:
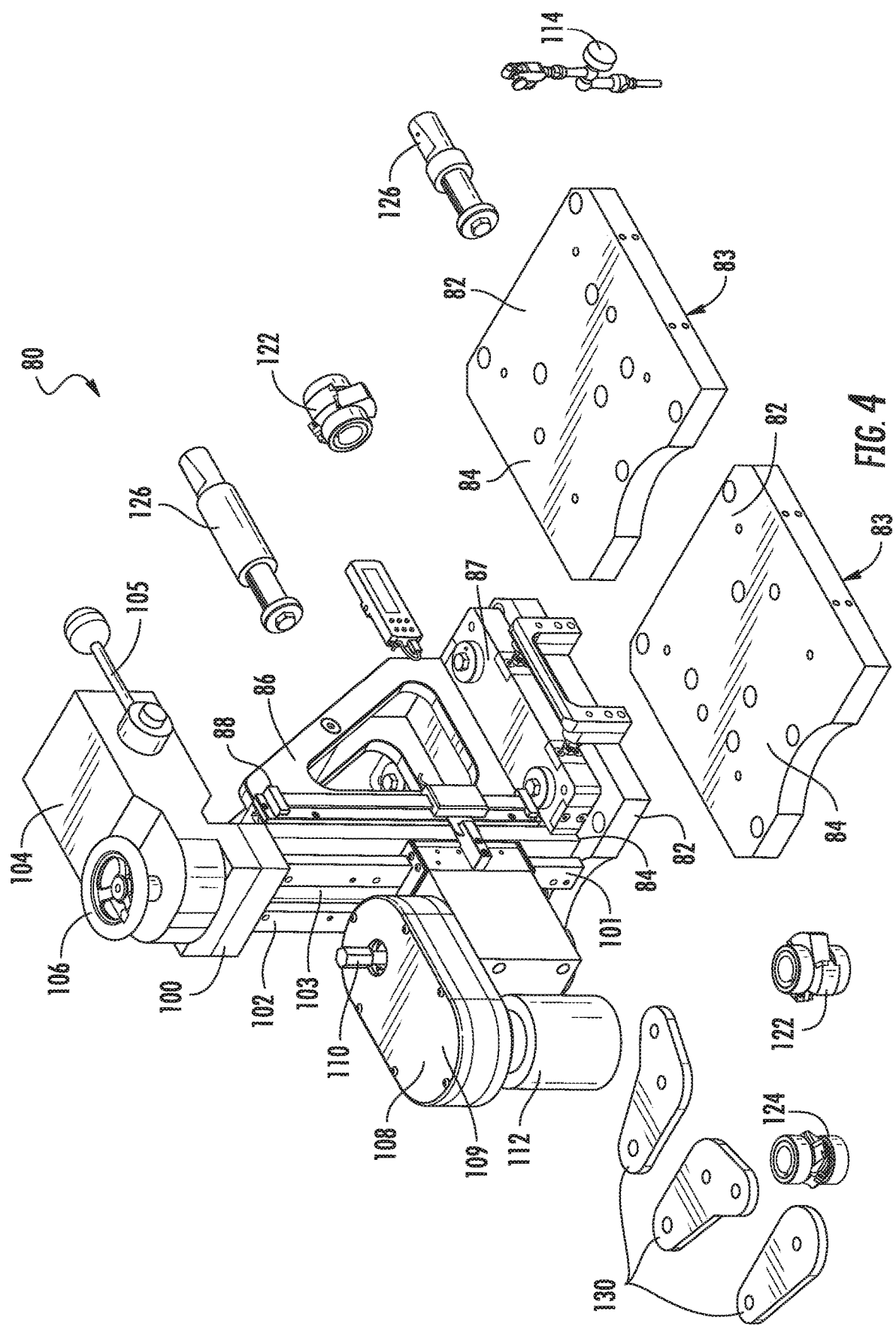
FIG. 4 is a blow-up diagram showing most elements of a jig and fixture embodiment disclosed herein.
Figure 5:
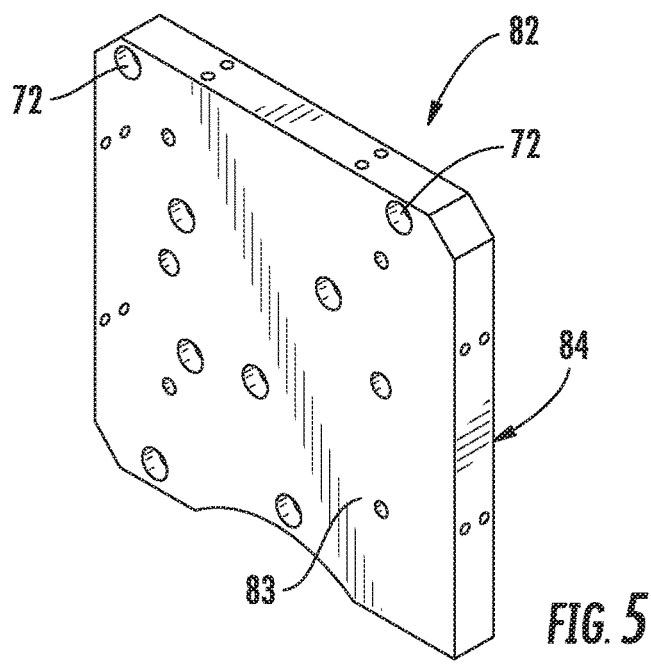
FIGS. 5 and 6 show an exemplary base plate and column assembly for a jig and fixture embodiment.

FIG. 4 is a blow-up diagram showing most elements of the jig and fixture 80 disclosed herein and detailed in later figures. At least one base plate 82, also seen in FIG. 5, can have a proximate side 83 and a distal side 84. The proximate side 83 can be removably engaged with the compressor discharge casing 21 using alignment mounting structure 72 for precise positioning and retention of the jig & fixture 80 during machining. Alignment mounting structure 72 can a plurality of projections 74 extending from the proximate side 83 of the base plate 82 that are removably engaged in predetermined positions with a complementary cover plate 70 mounted on the compressor discharge casing 21. Alignment mounting structure 72 can also be a plurality of connectors, such as bolts, clamps, etc., aligned for coupled engagement through the base plate 82 at predetermined positions on the compressor discharge casing 21.

Figure 6:
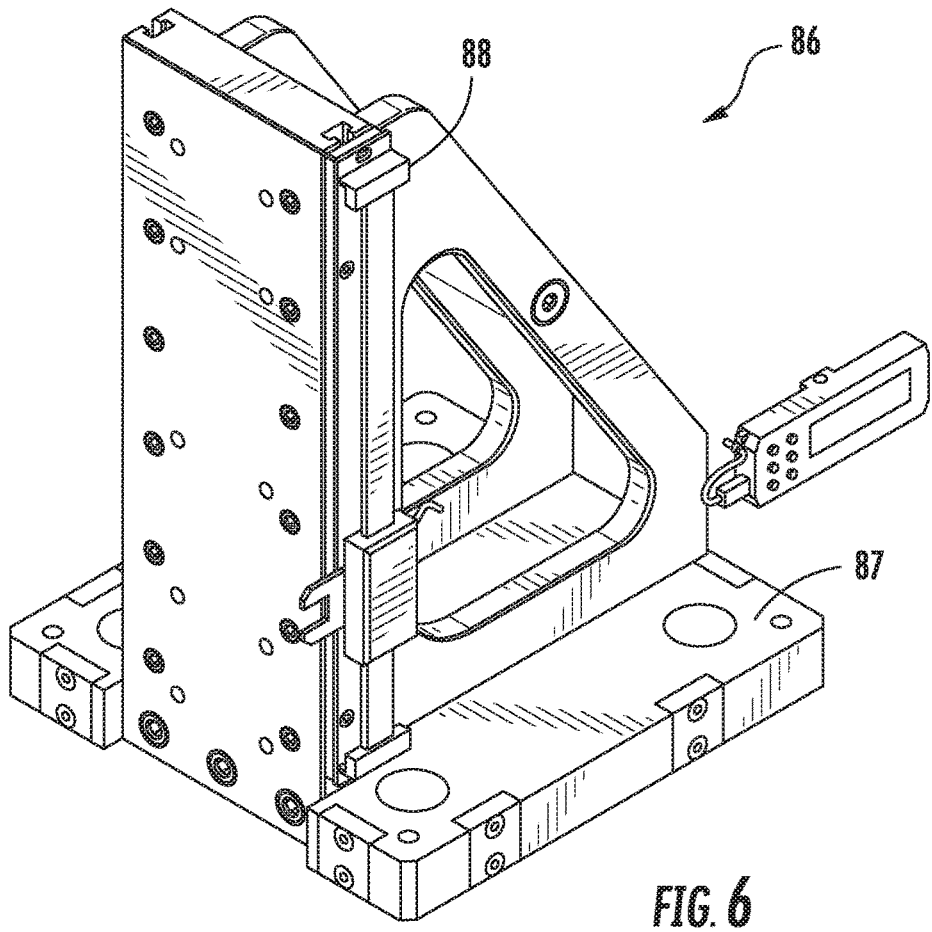
Figure 7:
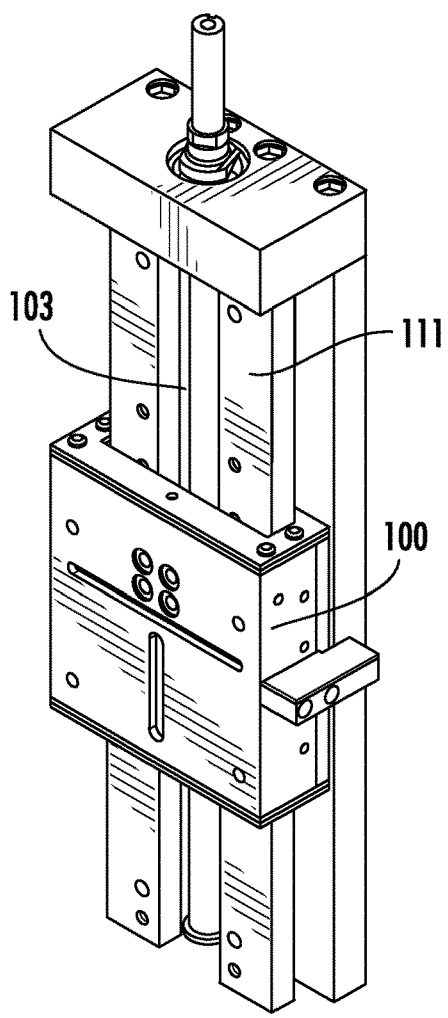
FIGS. 7-9 show exemplary elements of a slide assembly embodiment.
Figure 8:
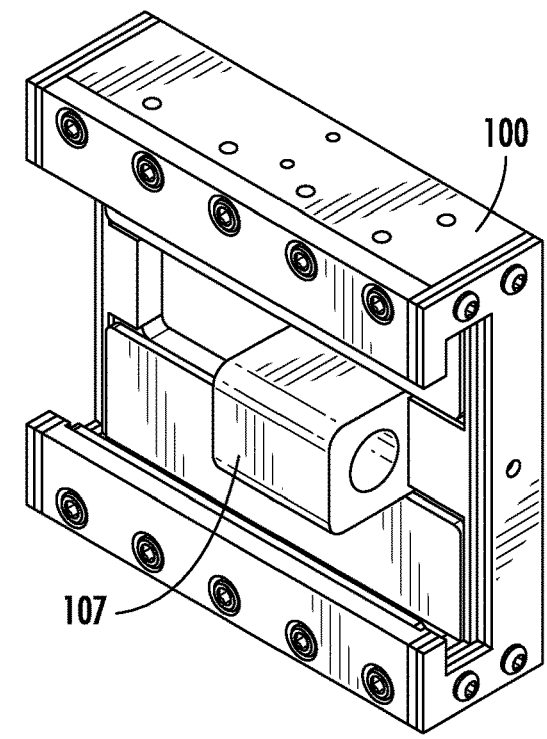
Figure 9:
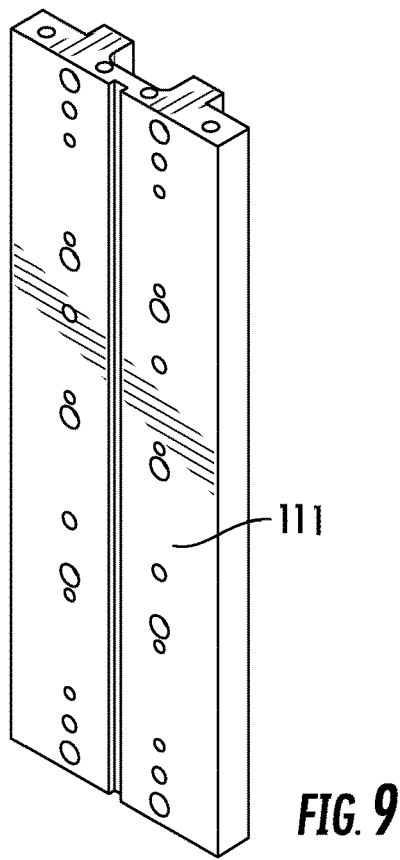

A column assembly 86, as shown in FIG. 6, can have a proximate portion 87 and a distal portion 88, the column assembly proximate portion 87 can be removably coupled to the distal side 84 of the at least one base plate 82. A slide assembly 100, as shown in FIGS. 7-9, can have a proximate end 101 and a distal end 102. The slide assembly 100 can be removably coupled to the column assembly 86. The slide assembly 100 can have a ball screw 103 extending from the slide assembly proximate end 101 to the slide assembly distal end 102. A ball nut carrier 107, carrying a ball (not shown), can be coupled to the slide assembly 100 and also threadably engaged with the ball screw 103. A power feed head 104 can be removably couple to the distal end 102 of the slide assembly 100 and removably coupled to the ball screw 103 such that when the power feed head 104 rotates the ball screw 103, the ball nut carrier 107 traverses the slide assembly 100 along the rail 111, both upstream and downstream, through a threaded engagement path with the ball screw 103 to engage and disengage with the work piece on the CDC 21. The power feed head 104 can have a locking mechanism 105 and a driving mechanism 106 that can be a hand wheel, hydraulic motor, electric motor, pneumatic motor, and mixtures thereof.

Figure 10:
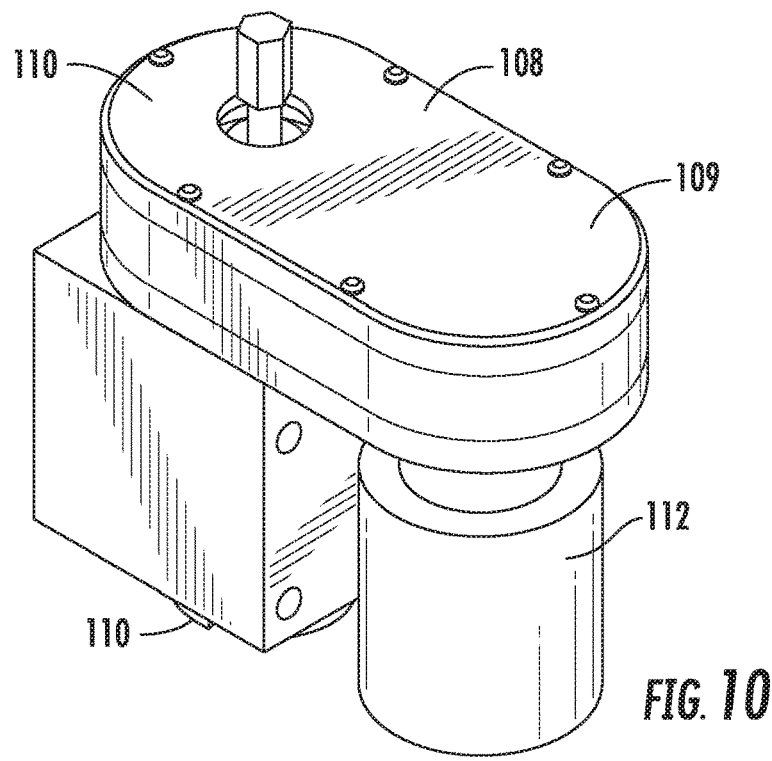
FIGS. 10-11 show an exemplary spindle unit.
Figure 11:
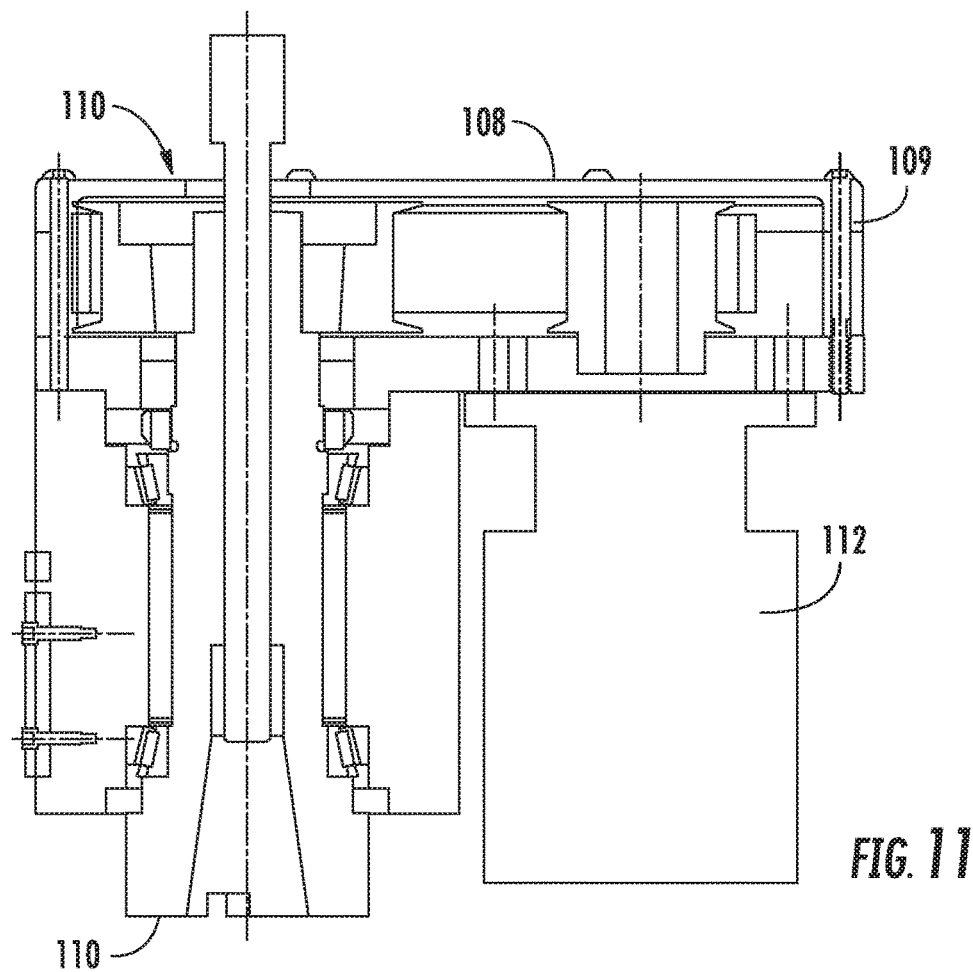
Figure 18:
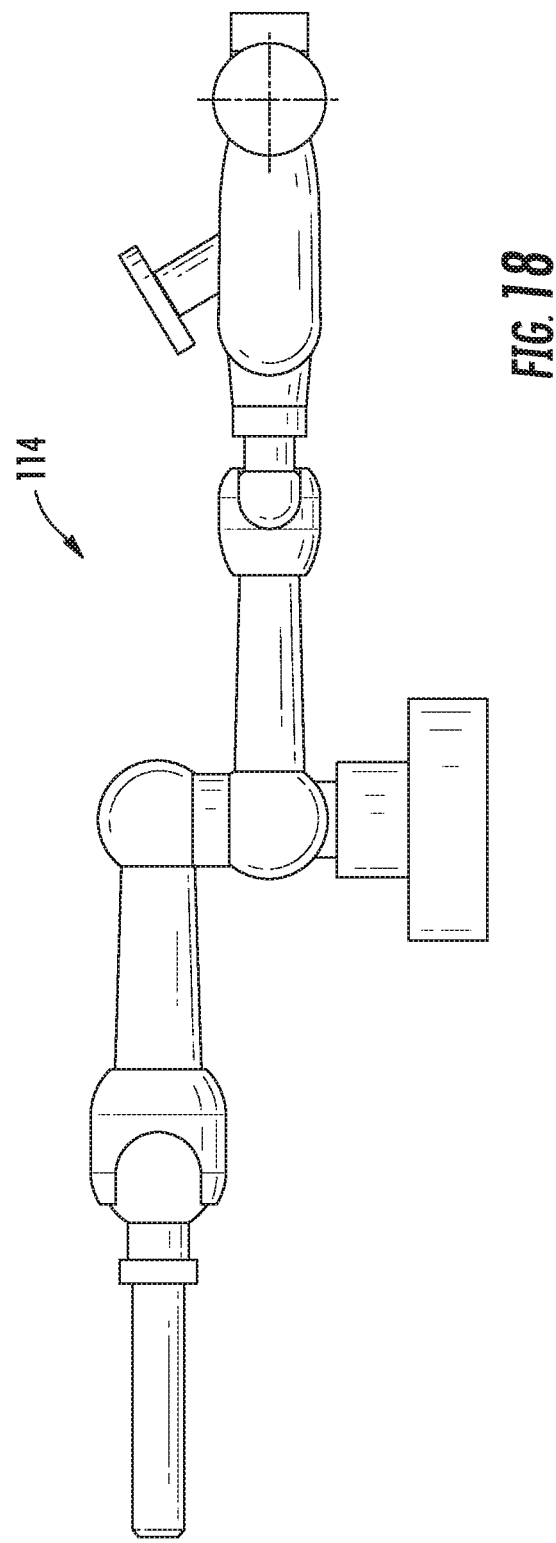
FIG. 18 shows an exemplary spindle positioner and holder.

A spindle unit 108, as seen in FIGS. 10 and 11, can have an input portion 109 and an output portion 110 and can be removably coupled to the slide assembly 100 for upstream axial movement 93 and downstream axial movement 92 of the spindle unit 108 as controlled by the slide assembly 100 that is driven by the power feed head 104 during machining operations. A motor 112 can be removably engaged with the input portion 109 of the spindle unit 108 to drive the output portion 110 through internal drive pulleys and drive belts (not shown). The motor 112 can be a hydraulic motor, electric motor, pneumatic motor, and mixtures thereof. The spindle unit 108 can also have a spindle positioner and holder 114, as seen in FIG. 18, removably engaged with the column assembly 86 and extending for positional engagement with the spindle unit 108. The spindle positioner and holder 114 provides precise positioning and holding of the spindle unit 108 as it traverses with the slide assembly 100.

Figure 12:
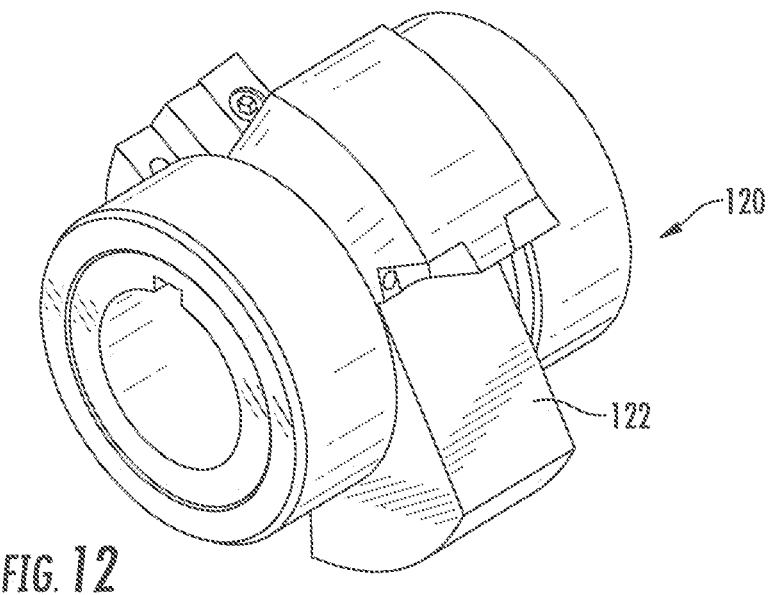
FIGS. 12-14 show exemplary cutter assemblies.
Figure 13:
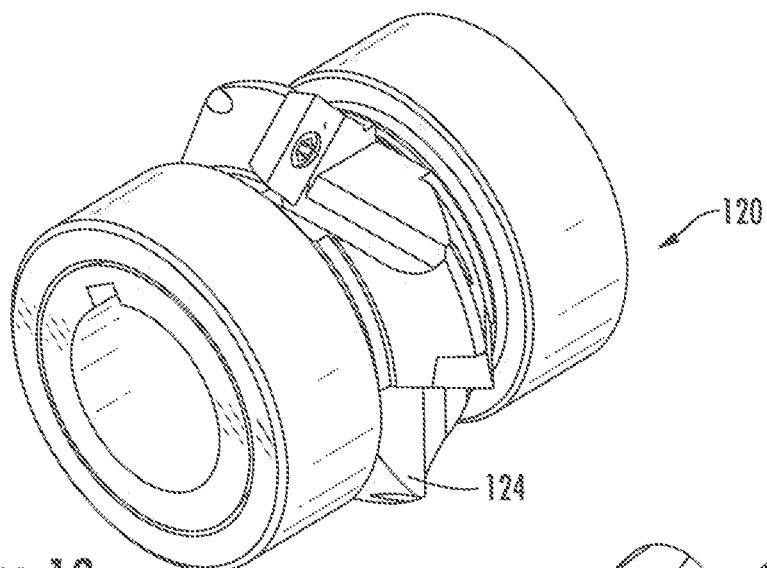
Figure 14:
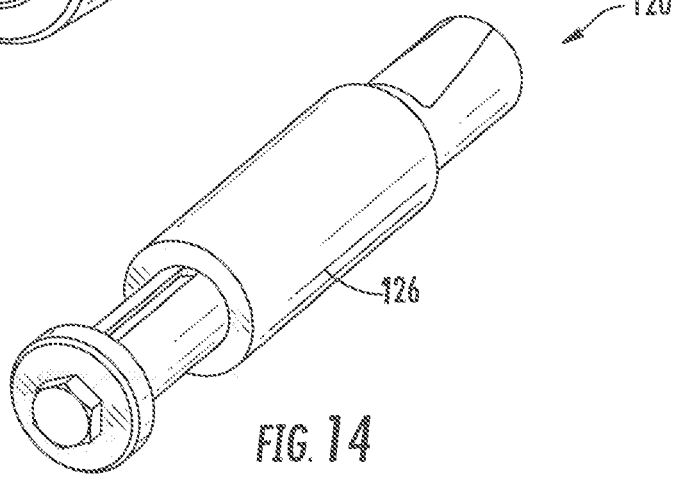
Figure 15:
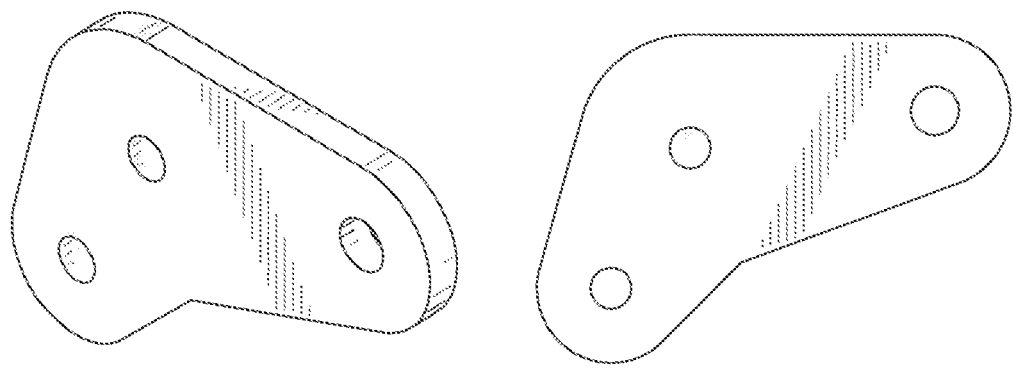
FIGS. 15-17 show exemplary drill jigs.
Figure 16:
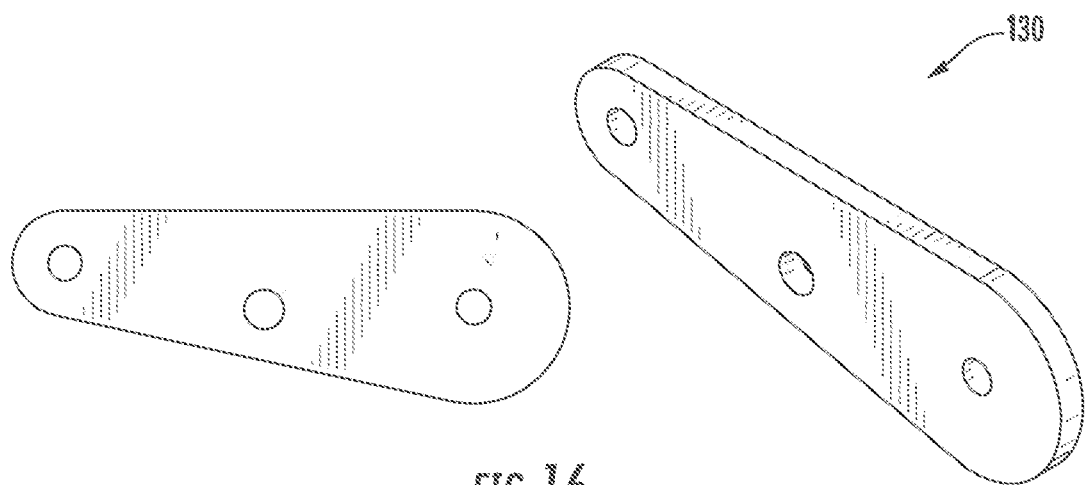
Figure 17:
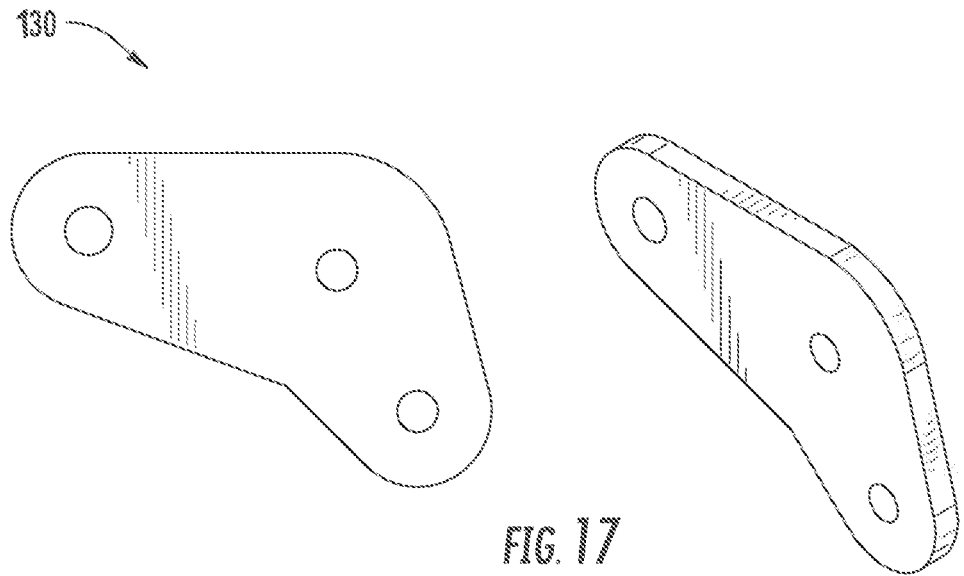
Figure 19:
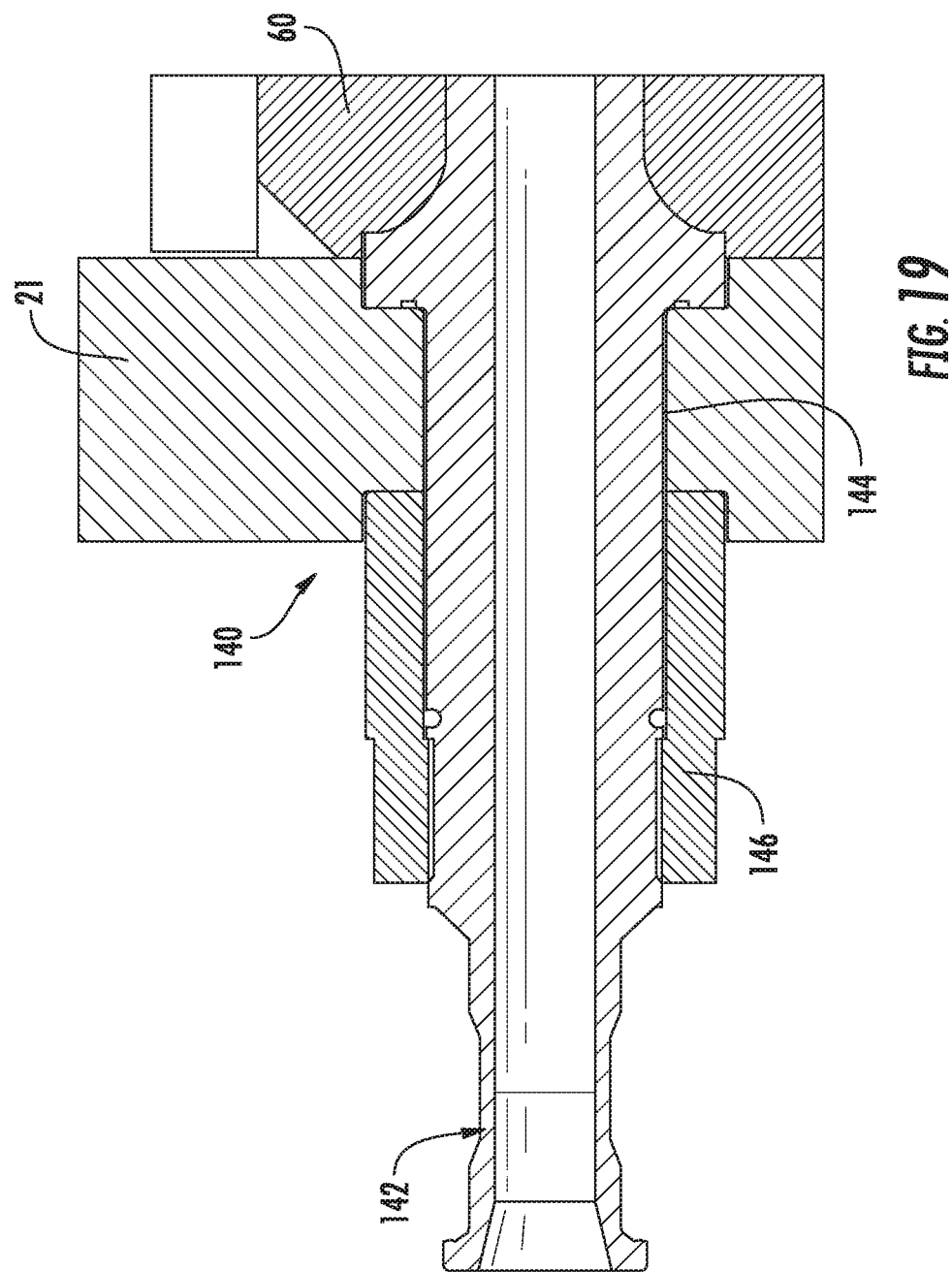
FIG. 19 shows an exemplary aperture and installed hub enabled by the jig and fixture embodiments disclosed herein.

As seen in FIGS. 12-14, at least one cutter assembly 120 can be removably engaged with the output portion 110 of the spindle unit 108. The at least one cutter assembly 120 can be a counterbore cutter assembly 122, a chamfer cutter assembly 124, a counterbore sink arbor assembly 126, and mixtures thereof. The cutter assembly 120 removably engages with the work piece on the CDC 21 to precisely machine openings such as shown in FIG. 19. At least one drill jig 130, as seen in FIGS. 15-17, can be removably engaged with the output portion 110 of the spindle unit 108 to accurately guide the cutter assembly 120 during machining. Different sizes of drill jigs 130 are required for various machining operations.

A typical aperture 140 machined by the jig & fixture 80 disclosed herein is seen in FIG. 19 with a quick disconnect hub 142 installed in the aperture 140. AFS fuel supply piping can be connected to the quick disconnect hub 142 to feed the axial fuel injectors. After a thru hole 144 is precisely bored through the CDC 21 into the fuel manifold 60 using predetermined mounting positions and structure for the jig & fixture 80, the counterbore sink arbor assembly 126 precisely machines the required shape on the internal annulus of the thru hole 144. A chamfer cutter assembly 124 then machines the required shape on the external annulus of the thru hole 144. The quick disconnect hub 142 is inserted in the thru hole 144 and is cinched in place by a removable lock nut with a counterbore collar 146. Subsequent welding and sealing around the quick disconnect hub 142 may be required to meet leak specifications.

This written description uses examples to disclose the invention, including the best mode, and also to enable any person skilled in the art to practice the invention, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A portable jig and fixture, comprising:
at least one base plate comprising a proximate side and a distal side,
a column assembly comprising a proximate portion and a distal portion, the column assembly proximate portion coupled to the distal side of the at least one base plate,
a slide assembly comprising a proximate end and a distal end, the slide assembly coupled to the column assembly,
a power feed head coupled to the distal end of the slide assembly,
a spindle unit comprising an input portion and an output portion, the spindle unit coupled with the slide assembly,
a motor engaged with the input portion of the spindle unit, at least one cutter assembly engaged with the output portion of the spindle unit, at least one drill jig engaged with the output portion of the spindle unit; and alignment mounting structure configured to engage with complementary structure on a compressor discharge casing of a turbomachine, the alignment mounting structure comprising a projection extending from the proximate side of the base plate, the complementary structure comprising a complementary cover plate configured to be able to mount in a combustor opening of the compressor discharge casing, the complementary cover plate corresponding in size and shape to the combustor opening of the compressor discharge casing, the complementary cover plate comprising a plurality of apertures, and the projection configured to engage in one aperture of the plurality of apertures of the complementary cover plate.

2. The portable jig and fixture of claim 1, wherein the slide assembly comprises a ball screw extending from the slide assembly proximate end to the slide assembly distal end.

3. The portable jig and fixture of claim 2, wherein the ball screw is engaged with the power feed head.

4. The portable jig and fixture of claim 1, wherein the power feed head further comprises a locking mechanism and a driving mechanism, wherein the driving mechanism is one of a group consisting of a hand wheel, hydraulic motor, electric motor, pneumatic motor, and combinations thereof.

5. The portable jig and fixture of claim 1, wherein the spindle unit comprises a spindle positioner and holder.

6. The portable jig and fixture of claim 1, wherein the motor is one of a group consisting of a hydraulic motor, electric motor, pneumatic motor, and combinations thereof.

7. The portable jig and fixture of claim 1, wherein the cutter is one of a group consisting of a counterbore cutter assembly, chamfer cutter assembly, counterbore sink arbor assembly, and combinations thereof.

8. A turbomachine, comprising:
a compressor section extending downstream to a compressor discharge casing;
a plurality of combustors comprising at least one axial fuel injection system, the plurality of combustors configured in a combustion section at least partially surrounded by the compressor discharge casing; and
a turbine section positioned downstream from the combustion section;
wherein the compressor discharge casing is engaged with a portable jig and fixture, comprising:
at least one base plate comprising a proximate side and a distal side, the proximate side engaged with the compressor discharge casing,
a column assembly comprising a proximate portion and a distal portion, the column assembly proximate portion coupled to the distal side of the at least one base plate,
a slide assembly comprising a proximate end and a distal end, the slide assembly coupled to the column assembly,
a power feed head coupled to the distal end of the slide assembly,
a spindle unit comprising an input portion and an output portion, the spindle unit coupled with the slide assembly,
a motor engaged with the input portion of the spindle unit,
at least one cutter assembly engaged with the output portion of the spindle unit, and
at least one drill jig engaged with the output portion of the spindle unit,
wherein each of the at least one base plates comprises alignment mounting structure engaging with complementary structure on the compressor discharge casing, the alignment mounting structure comprising a projection extending from the proximate side of the base plate, the complementary structure comprising a complementary cover plate mounted in a combustor opening of the compressor discharge casing, the complementary cover plate corresponding in size and shape to the combustor opening of the compressor discharge casing, the complementary cover plate comprising a plurality of apertures, and the projection engaged in one aperture of the plurality of apertures of the complementary cover plate.

9. The turbomachine of claim 8, wherein the alignment mounting structure comprises a plurality of connectors aligned for engagement at predetermined positions on the compressor discharge casing.

10. The turbomachine of claim 8, wherein the slide assembly comprises a ball screw extending from the slide assembly proximate end to the slide assembly distal end.

11. The turbomachine of claim 10, wherein the ball screw is removably engaged with the power feed head.

12. The turbomachine of claim 8, wherein the power feed head comprises a locking mechanism and a driving mechanism one of a group consisting of a hand wheel, hydraulic motor, electric motor, pneumatic motor, and combinations thereof.

13. The turbomachine of claim 8, wherein the spindle unit comprises a spindle positioner and holder.

14. The turbomachine of claim 8, wherein the motor one of a group consisting of a hydraulic motor, electric motor, pneumatic motor, and combinations thereof.

15. The turbomachine of claim 8, wherein the cutter one of a group consisting of a counterbore cutter assembly, chamfer cutter assembly, counterbore sink arbor assembly, and combinations thereof.

16. The turbomachine of claim 8, wherein the complementary cover plate is correspondingly shaped with the combustor opening, the combustor opening being formed through the compressor discharge casing for receiving a first one of the plurality of combustors during an installation thereof.

* * * * *